(12) United States Patent
Jan

(10) Patent No.: US 9,353,959 B2
(45) Date of Patent: May 31, 2016

(54) HUMIDITY REGULATING APPARATUS

(71) Applicant: Altrason Inc., Taipei (TW)

(72) Inventor: Po-Sheng Jan, Taipei (TW)

(73) Assignee: ALTRASON INC., Taipei (TW)

( * ) Notice: Subject to any disclaimer, the term of this patent is extended or adjusted under 35 U.S.C. 154(b) by 0 days.

(21) Appl. No.: 14/309,522

(22) Filed: Jun. 19, 2014

(65) Prior Publication Data

US 2015/0323202 A1    Nov. 12, 2015

(30) Foreign Application Priority Data

May 6, 2014    (TW) .............................. 103116165 A

(51) Int. Cl.
| | | |
|---|---|---|
| *B01D 53/02* | (2006.01) | |
| *F24F 3/14* | (2006.01) | |
| *B01D 53/08* | (2006.01) | |
| *B01D 53/26* | (2006.01) | |

(52) U.S. Cl.
CPC .............. *F24F 3/1423* (2013.01); *B01D 53/08* (2013.01); *B01D 53/261* (2013.01); *F24F 2003/1458* (2013.01)

(58) Field of Classification Search
CPC ...... B01D 53/06; B01D 53/265; F24F 3/1423
See application file for complete search history.

(56) References Cited

U.S. PATENT DOCUMENTS

| | | | | |
|---|---|---|---|---|
| 5,181,387 A | * | 1/1993 | Meckler ................. | F02G 1/043 62/176.1 |
| 5,873,256 A | * | 2/1999 | Denniston .......... | B60H 1/00414 62/244 |
| 6,311,511 B1 | * | 11/2001 | Maeda .................. | F24F 3/1411 62/271 |
| 2014/0157806 A1 | * | 6/2014 | Ito ......................... | F24F 3/1411 62/92 |

* cited by examiner

*Primary Examiner* — Christopher P Jones
(74) *Attorney, Agent, or Firm* — Maschoff Brennan

(57) ABSTRACT

A humidity regulating apparatus comprises a hygroscopic wheel for absorbing moisture and water surrounding the hygroscopic wheel, a wetting means controlled to supply moisture or water to the hygroscopic wheel; a heating means for heating the moisture and water absorbed within the hygroscopic wheel to evaporate into vapor; a transporting means having a vapor inlet opening, a humidifying outlet opening, and a dehumidifying outlet opening, the vapor inlet opening is connected with the heating means for importing the vapor thereto, the transporting means is configured to switch between a state that the vapor inlet opening interconnects with the humidifying outlet opening with which the target environment is interconnected and a state that the vapor inlet opening interconnects with the dehumidifying outlet opening; and a condensing means, connected with the dehumidifying outlet opening, thus regulating the relative humidity in the target environment.

12 Claims, 10 Drawing Sheets

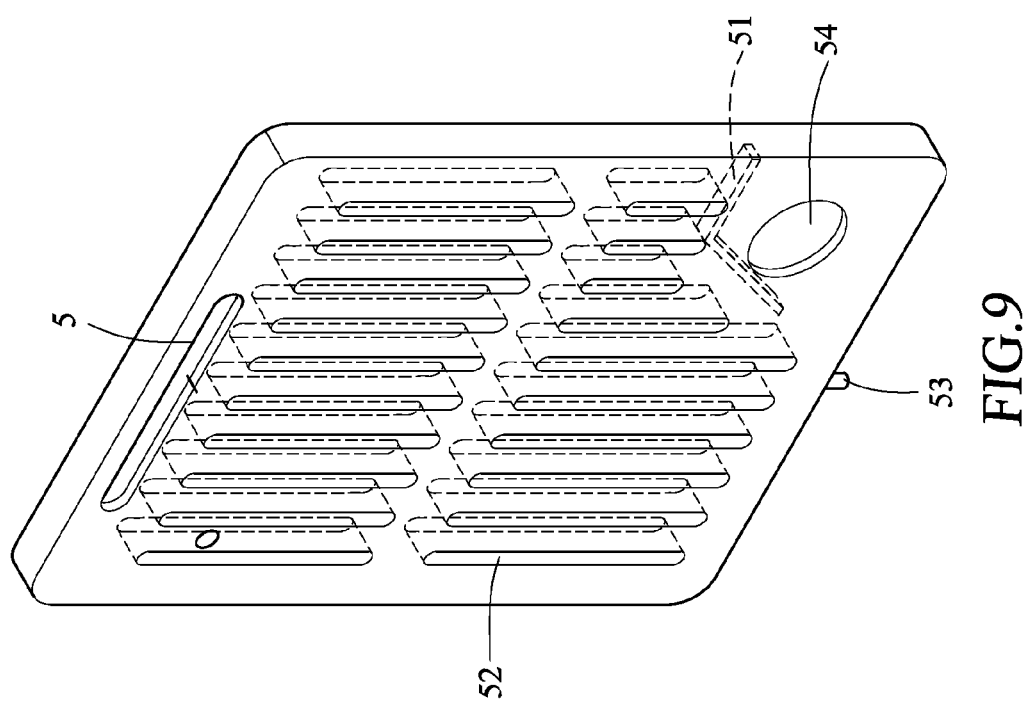

HUMIDITY REGULATING APPARATUS

CROSS-REFERENCE TO RELATED APPLICATION

This application claims priority to Taiwanese Patent Application No. 103116165, filed May 6, 2014, which is hereby incorporated by reference.

FIELD OF THE INVENTION

The present invention relates to an air conditioning apparatus, and more particularly, to a humidity regulating apparatus.

BACKGROUND OF THE INVENTION

The higher the air temperature is, the higher the saturated humidity becomes. In medicine, the relative humidity is closely associated with human respiration. At a relative humidity of about 45 to 50 percent, the human body feels most comfortable since oxygen easily passes through the alveoli into the blood. When both the temperature and relative humidity are high, the human body feels sultry and uncomfortable as the thermoregulatory function of perspiration is prone to be influenced. In an environment with insufficient humidity, the human skin may feel dry and itchy, and the mucous membranes tend to get irritated. In addition, the relative humidity is very important to museums, libraries, manufacturing industry, building industry, wine industry, etc. A high humidity environment tends to breed worms, mildew, termites and bacteria, etc. A low humidity environment is likely to result in the moisture content of a material being too low, thus leading to damage such as the variation of stress, embrittlement, cracking and warping in the material.

However, conventional humidity regulating apparatuses, such as a humidifier merely capable of increasing the relative humidity and a dehumidifier merely capable of decreasing the relative humidity, can not simultaneously serve both of the functions for increasing and decreasing the relative humidity, so they lack practicality.

SUMMARY OF THE INVENTION

In view of this, the present invention provides a humidity regulating apparatus for both functions of increasing and decreasing the relative humidity.

A principal object of the present invention is to provide a humidity regulating apparatus, which is applied in a target environment where the relative humidity is to be regulated, comprising: a hygroscopic wheel for being rotated in a direction to absorb moisture and water surrounding the hygroscopic wheel; a wetting means disposed in a position corresponding to the hygroscopic wheel, wherein the wetting means performs a movement in relation to the hygroscopic wheel and is controlled to supply moisture or water to the hygroscopic wheel; a heating means thermally connected with the hygroscopic wheel, wherein the heating means performs a movement in relation to the hygroscopic wheel to heat the moisture and water absorbed within the hygroscopic wheel to evaporate into vapor; a transporting means having a vapor inlet opening, a humidifying outlet opening, and a dehumidifying outlet opening, wherein the vapor inlet opening is connected with the heating means for importing the vapor thereto, the transporting means is configured to switch between a state that the vapor inlet opening interconnects with the humidifying outlet opening with which the target environment is interconnected and a state that the vapor inlet opening is communicated with the dehumidifying outlet opening; and a condensing means, connected with the dehumidifying outlet opening, for collecting and condensing the imported vapor to reduce the relative humidity in the target environment.

Another object of the present invention is to provide a humidity regulating apparatus, wherein the humidity regulating apparatus further comprises an external fan, which is thermally connected with the condensing means.

Another object of the present invention is to provide a humidity regulating apparatus, wherein the humidity regulating apparatus further comprises an internal fan, which is thermally connected with the heating means.

Another object of the present invention is to provide a humidity regulating apparatus, wherein the wetting means is disposed adjacent to the heating means according to the rotation direction of the hygroscopic wheel.

Another object of the present invention is to provide a humidity regulating apparatus, wherein the heating means is disposed to both hygroscopic surfaces of the hygroscopic wheel.

Another object of the present invention is to provide a humidity regulating apparatus, wherein the transporting means includes a rotary switching member which is rotatably mounted within the transporting means and has a humidifying air passage and a dehumidifying air passage that are separated from each other by an isolation plate, the rotary switching member is switched between a humidifying transporting position and a humidifying transporting position in which the humidifying air passage is interconnected between the vapor inlet opening and the humidifying outlet opening when the rotary switching member is switched to the humidifying transporting position, and the dehumidifying air passage is interconnected between the vapor inlet opening and the dehumidifying outlet opening when the rotary switching member is switched to the dehumidifying transporting position.

Another object of the present invention is to provide a humidity regulating apparatus, wherein the condensing means is provided with a separator.

Another object of the present invention is to provide a humidity regulating apparatus, wherein the condensing means includes a drain terminal for draining away condensed water from the condensing means.

Another object of the present invention is to provide a humidity regulating apparatus, wherein the humidity regulating apparatus further comprises a relative humidity sensing means for sensing the relative humidity in the target environment.

Another object of the present invention is to provide a humidity regulating apparatus, wherein the wetting means includes a linking member and a hydraulic conducting member, the linking member is linked to the rotary switching member, the hydraulic conducting member is linked to the linking member, the hydraulic conducting member is in contact with both hygroscopic surfaces of the hygroscopic wheel when the rotary switching member is switched to the humidifying transporting position, and the hydraulic conducting member is pressed by the linking member to detach from both hygroscopic surfaces of the hygroscopic wheel when the rotary switching member is switched to the dehumidifying transporting position.

Another object of the present invention is to provide a humidity regulating apparatus, wherein the transporting means includes an actuating member, which is linked to the rotary switching member.

Another object of the present invention is to provide a humidity regulating apparatus, wherein the wetting means includes a water spraying member.

By way of the technical means adopted by the present invention, the humidity regulating apparatus of the present invention simultaneously serve both functions of increasing and decreasing the relative humidity. Hence, it is not necessary to buy a humidifier and a dehumidifier separately, thus saving the purchase costs and installation space.

Moreover, the humidity regulating apparatus is capable of switching between a humidifying status and a dehumidifying status according to the change of the relative humidity in the target environment sensed by the relative humidity sensing means automatically, so that a suitable relative humidity in the target environment can be maintained at any time.

BRIEF DESCRIPTION OF THE DRAWINGS

The structure and the technical means adopted by the present invention to achieve the above and other objectives can be best understood by referring to the following detailed description of the preferred embodiments and the accompanying drawings.

FIG. 9 is a stereogram illustrating a condensing means of the humidity regulating apparatus according to the first embodiment of the present invention.

DETAILED DESCRIPTION OF THE PREFERRED EMBODIMENTS

Embodiments are described in detail below with reference to the FIG. 1a to FIG. 9, and the description is used for explaining the embodiments of the present invention only, but not intended to limit the described embodiments of the present invention.

Figure 1A:
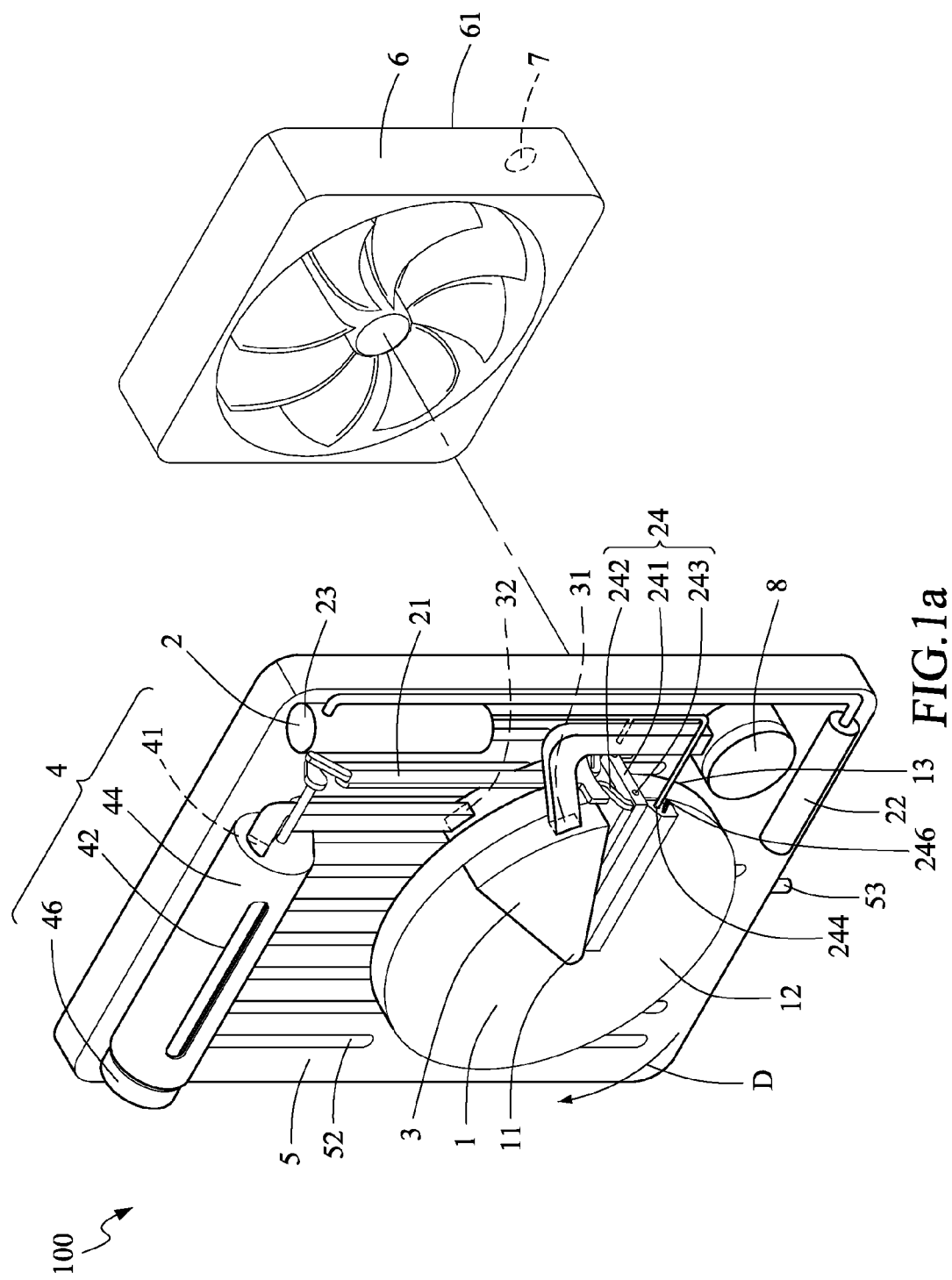
FIG. 1a is a stereogram illustrating a humidity regulating apparatus according to a first embodiment of the present invention.
Figure 1B:
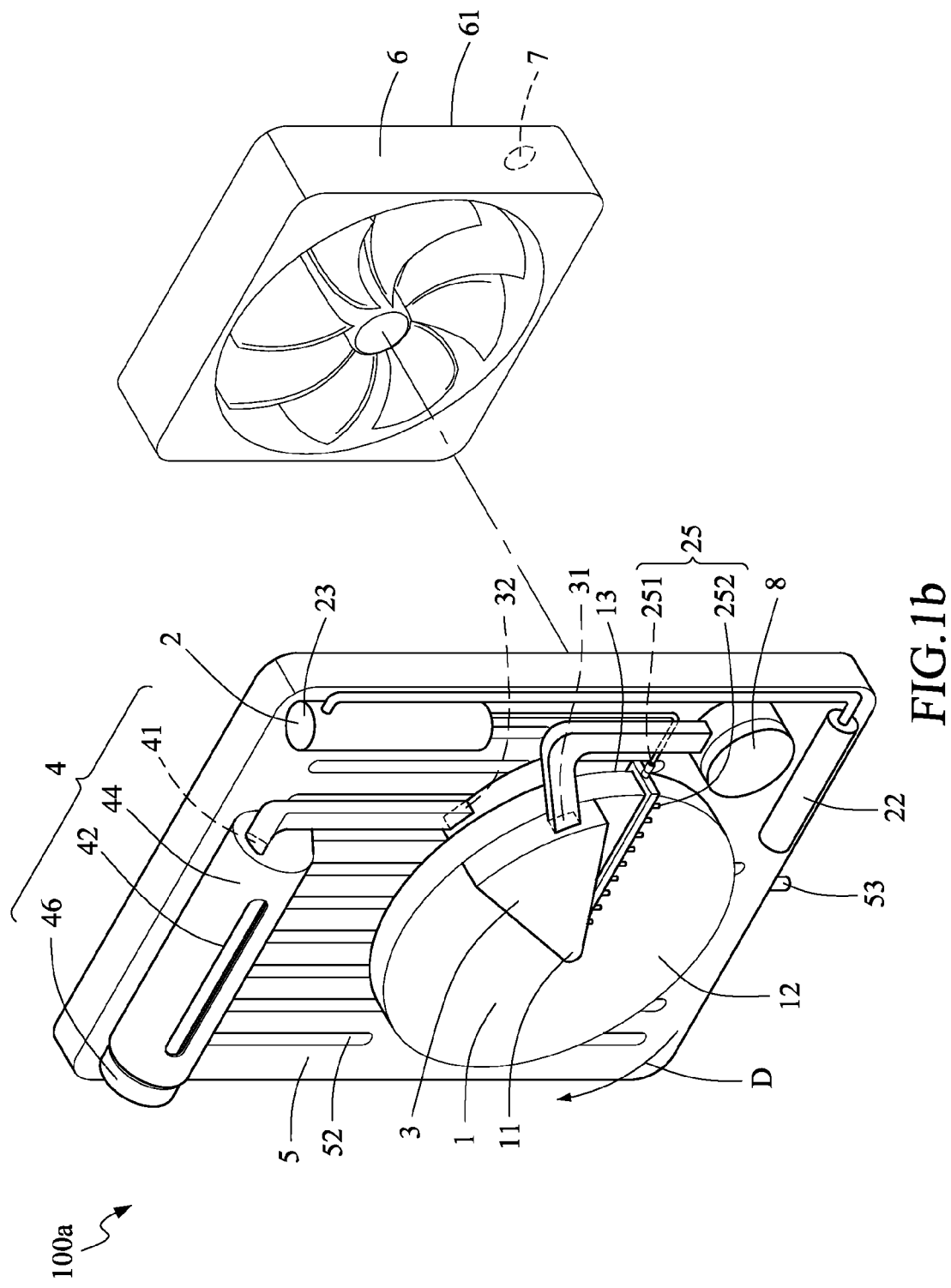
FIG. 1b is a stereogram illustrating a humidity regulating apparatus according to a second embodiment of the present invention.

Referring to FIG. 1a, a humidity regulating apparatus 100 according to the first embodiment of the present invention is applied in a target environment where the relative humidity is to be regulated. The humidity regulating apparatus 100 includes a hygroscopic wheel 1, a wetting means 2, a heating means 3, a transporting means 4, and a condensing means 5.

The hygroscopic wheel 1 is rotated in a direction D to absorb moisture and water surrounding the hygroscopic wheel 1. Preferably, the hygroscopic wheel 1 has a plurality of micro pores for achieving good effects of moisture absorption. For example, the hygroscopic wheel 1 is made of such hygroscopic materials as zeolite, silica gel, activated alumina and activated carbons.

The wetting means 2 is disposed in a position corresponding to the hygroscopic wheel 1 and performs a movement in relation to the hygroscopic wheel 1. The wetting means 2 is controlled to supply moisture or water to the hygroscopic wheel 1. In the first embodiment, the wetting means 2 is fixed on an axle 11 around which the hygroscopic wheel 1 rotates.

The heating means 3 is thermally connected to the hygroscopic wheel 1 and performs a movement in relation to the hygroscopic wheel 1 so as to heat the moisture and water absorbed within the hygroscopic wheel 1 to evaporate into vapor V. In the first embodiment, the heating means 3 is fixed on the axle 11 of the hygroscopic wheel 1.

The transporting means 4 is provided with a vapor inlet opening 41, a humidifying outlet opening 42, and a dehumidifying outlet opening 43. The vapor inlet opening 41 is connected with the heating means for importing the vapor V thereto. The transporting means 4 is configured to switch between a state that the vapor inlet opening 41 interconnects with the humidifying outlet opening 42 with which the target environment is interconnected and a state that the vapor inlet opening 41 interconnects with the dehumidifying outlet opening 43.

The condensing means 5, which is connected with the dehumidifying outlet opening 43, is for collecting and condensing the imported vapor V to reduce the relative humidity in the target environment.

Figure 2:
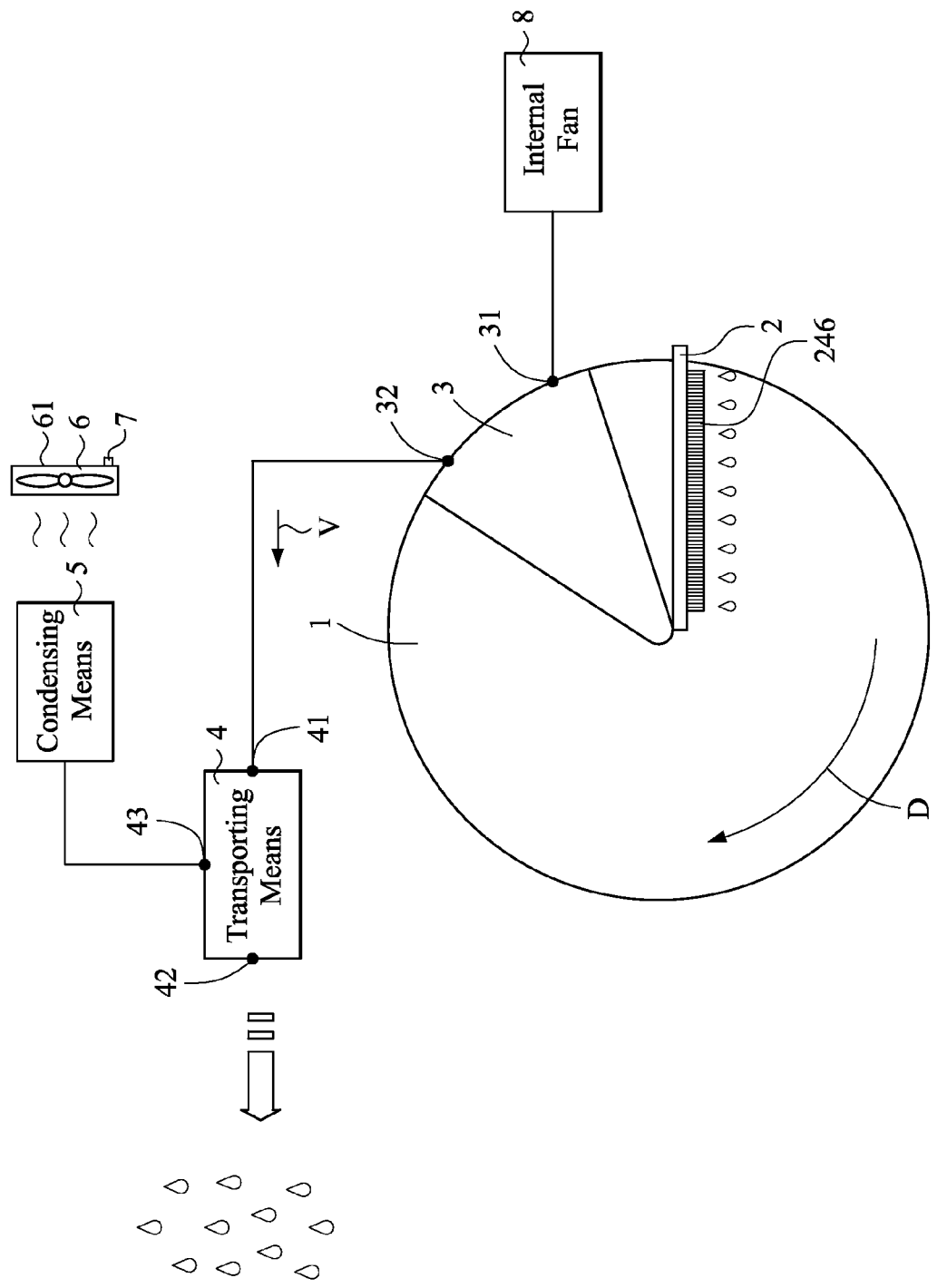
FIG. 2 is a block diagram illustrating the humidity regulating apparatus in a humidifying status according to the first embodiment of the present invention.

Referring to FIG. 2, when there is a necessity to humidify the target environment, the wetting means 2 is controlled to supply water to the hygroscopic wheel 1, and then the heating means 3 heats the moisture and water absorbed within the hygroscopic wheel 1 to evaporate into vapor V. After that, the transporting means 4 is configured to interconnect the vapor inlet opening 41 and the humidifying outlet opening 42 and disconnect the vapor inlet opening 41 from the dehumidifying outlet opening 43 at the same time. The vapor V is caused to flow to the target environment through the humidifying outlet opening 42, thereby increasing the relative humidity in the target environment is.

Figure 3:
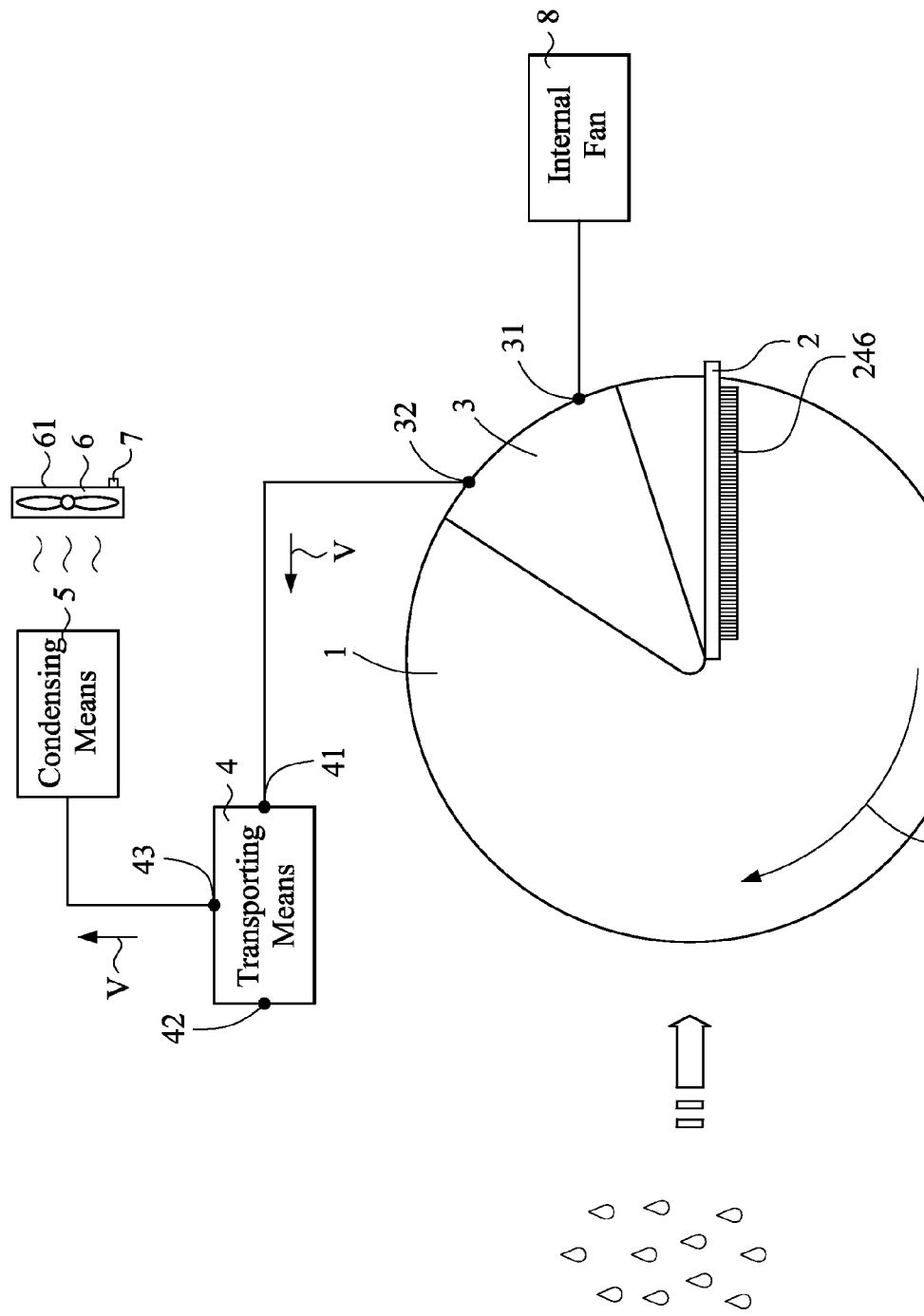
FIG. 3 is a block diagram illustrating the humidity regulating apparatus in a dehumidifying status according to the first embodiment of the present invention.

Referring to FIG. 3, when there is a necessity to dehumidify the target environment, the wetting means 2 is controlled to suspend water supply, and the moisture and water of the target environment are absorbed within the hygroscopic wheel 1, and then the heating means 3 heats the moisture and water absorbed within the hygroscopic wheel 1 to evaporate into vapor V. After that, the transporting means 4 is configured to interconnect the vapor inlet opening 41 and the dehumidifying outlet opening 43 and disconnect the vapor inlet opening 41 from the humidifying outlet opening 42 at the same time. so that, The vapor V is caused to flow to the condensing means 5 through the dehumidifying outlet opening 43 and be condensed by the condensing means 5, thus reducing the relative humidity in the target environment.

Figure 4:
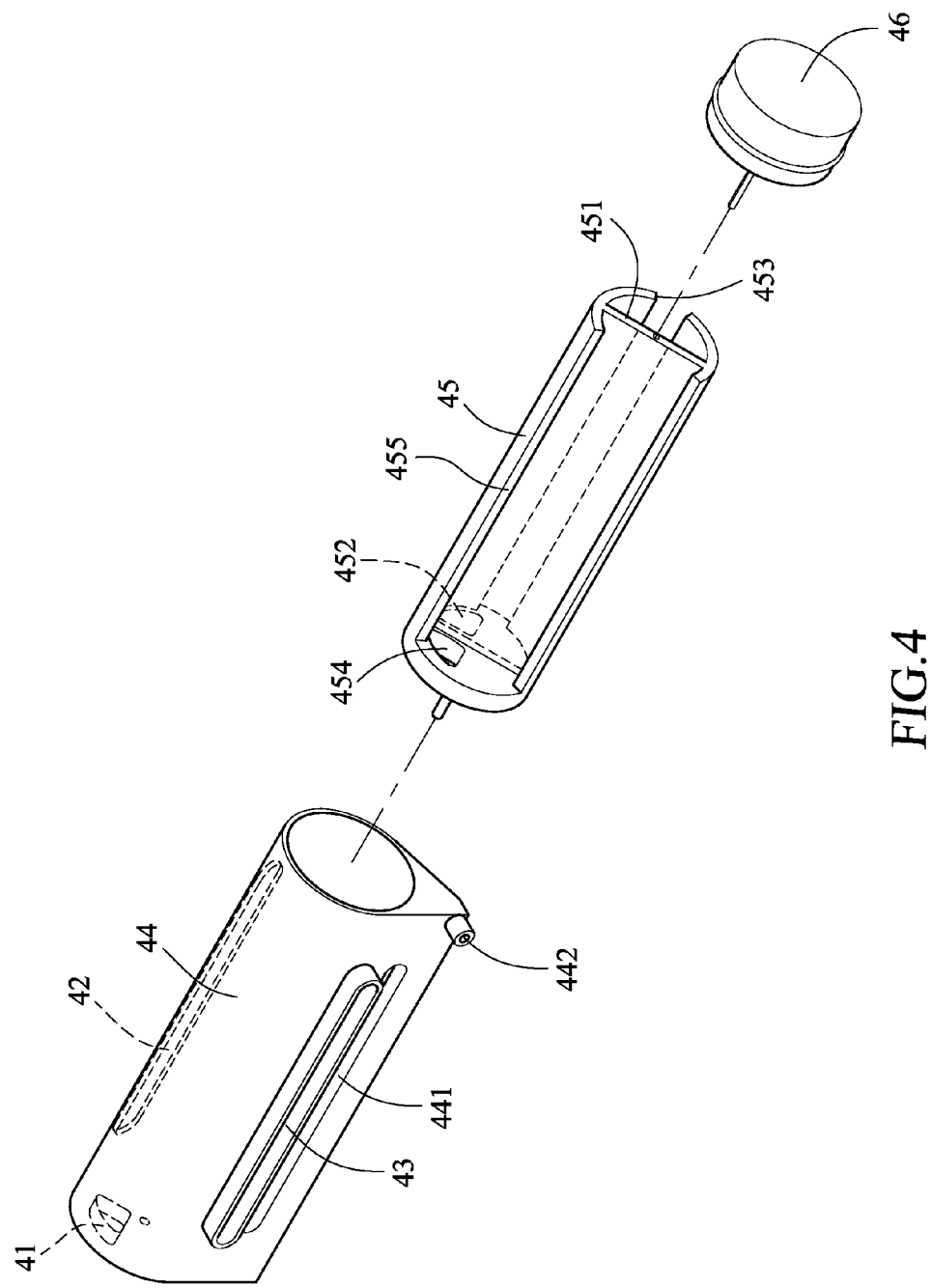
FIG. 4 is an exploded back view illustrating a transporting means of the humidity regulating apparatus according to the first embodiment of the present invention.

Referring to FIG. 4, in the first embodiment, the transporting means includes a housing member 44, a rotary switching member 45, and an actuating member 46. The vapor inlet opening 41, the humidifying outlet opening 42, and the dehumidifying outlet opening 43 are allocated on the housing member 44. The rotary switching member 45 is rotatably mounted within the housing member 44. The rotary switching member 45 has a humidifying air passage and a dehumidifying air passage that are separated from each other by an isolation plate 451. The rotary switching member 45 is able to rotate to switch between a humidifying transporting position and a humidifying transporting position. The actuating member 46 connected to an end of the rotary switching member 45 is rotated to switch the position of the rotary switching member 45 to the humidifying transporting position or the dehumidifying transporting position.

Figure 5:
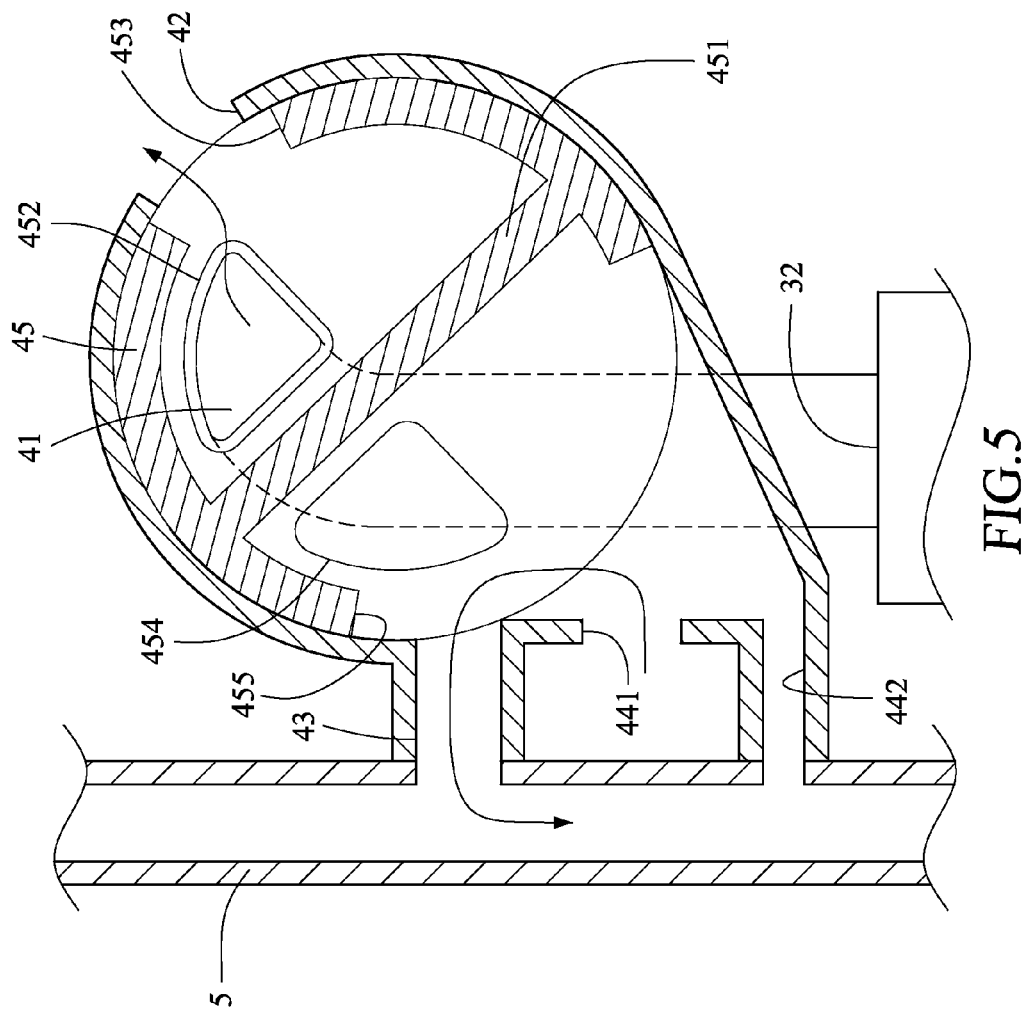
FIG. 5 is the first schematic drawing of the humidity regulating apparatus in the humidifying status according to the first embodiment of the present invention.

Referring to FIG. 5, when the rotary switching member 45 is switched to the humidifying transporting position, the humidifying air passage is interconnected between the vapor inlet opening 41 and the humidifying outlet opening 42. In other words, the humidifying air passage is located on one side of the isolation plate 451 and has a humidifying air inlet 452 and a humidifying air outlet 453. When the rotary switching member 45 is switched to the humidifying transporting position, the humidifying air inlet 452 interconnects with the vapor inlet opening 41, and the humidifying air outlet 453 interconnects with the humidifying outlet opening 42, so that the vapor V can be transported to the target environment.

Figure 6:
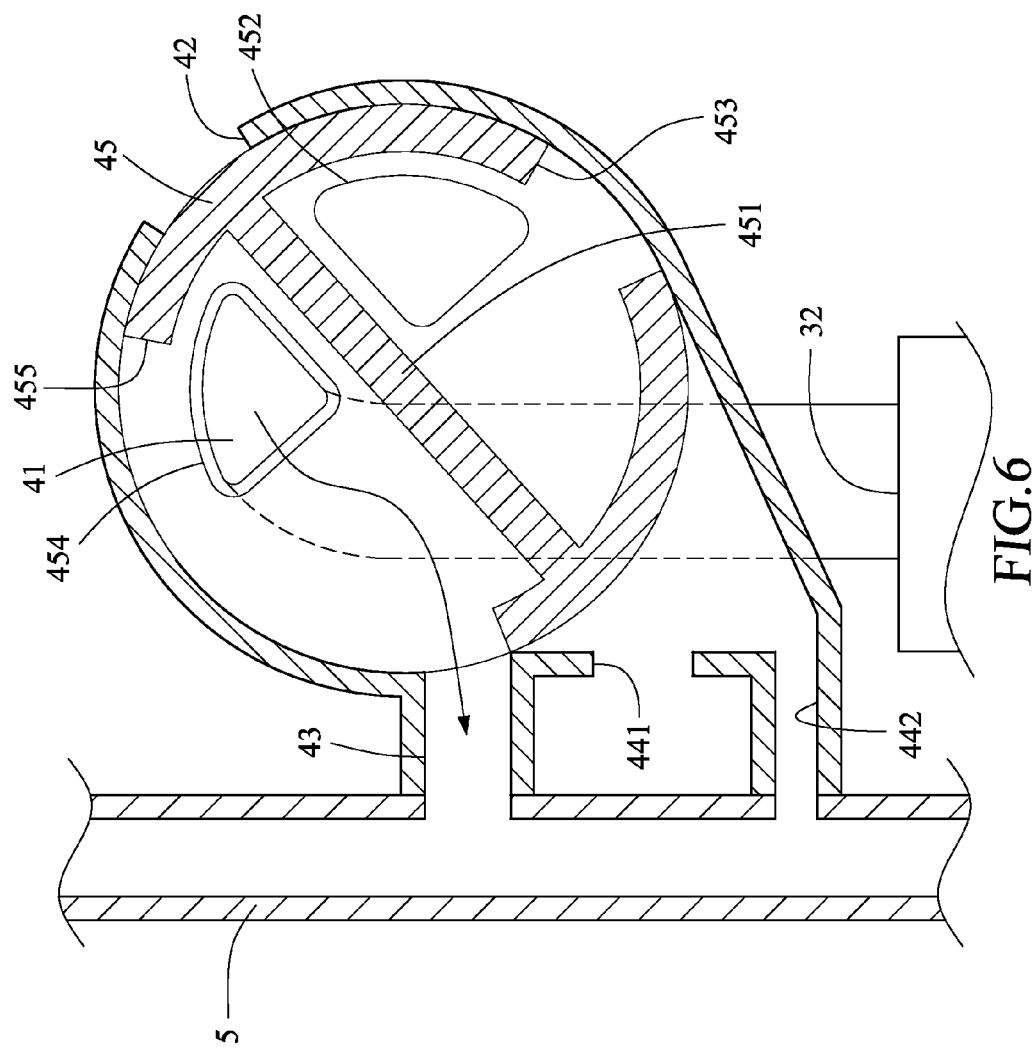
FIG. 6 is the first schematic drawing of the humidity regulating apparatus in the dehumidifying status according to the first embodiment of the present invention.
Figure 7:
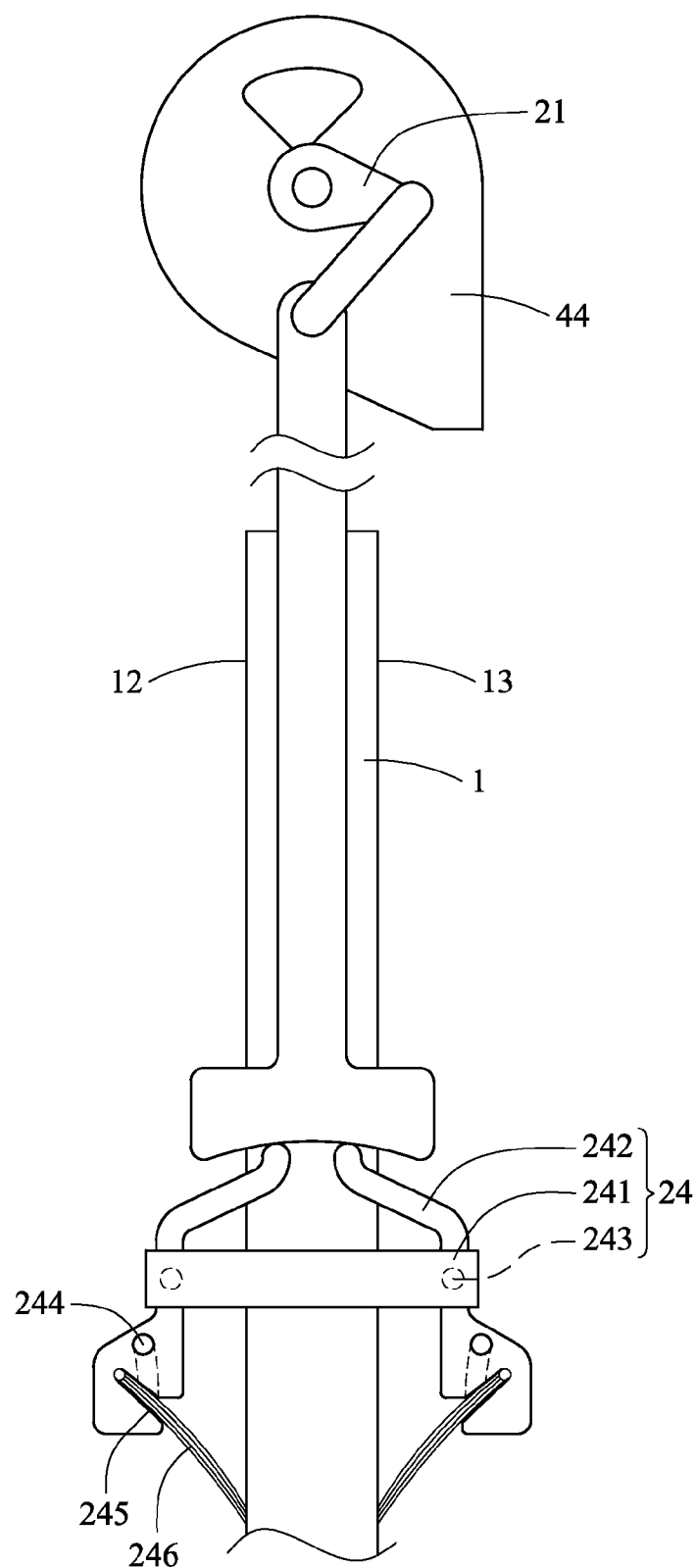
FIG. 7 is the second schematic drawing of the humidity regulating apparatus in the humidifying status according to the first embodiment of the present invention.
Figure 8:
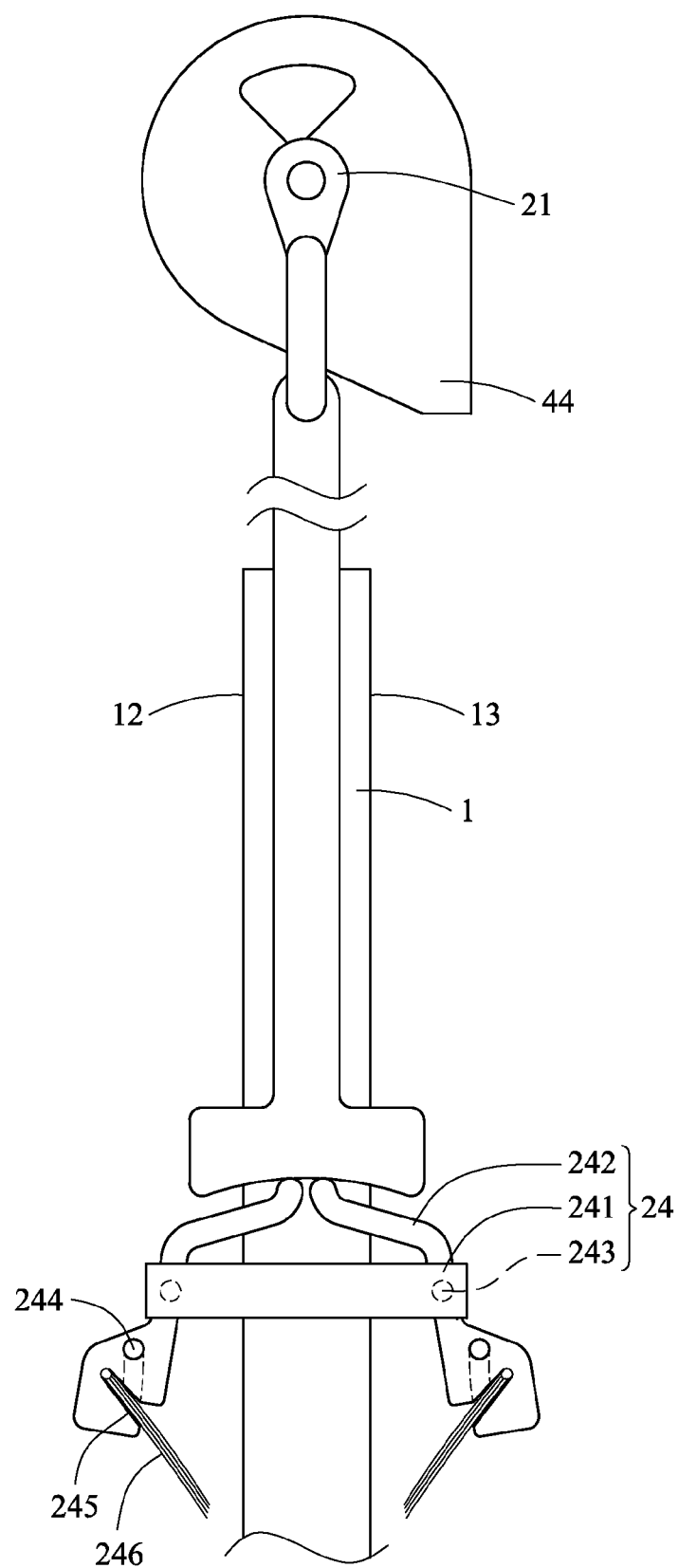
FIG. 8 is the second schematic drawing of the humidity regulating apparatus in the dehumidifying status according to the first embodiment of the present invention.

Referring to FIG. 6, when the rotary switching member 45 is switched to the dehumidifying transporting position, the dehumidifying air passage is interconnected between the vapor inlet opening 41 and the dehumidifying outlet opening 43. In other words, the dehumidifying air passage is located on another side of the isolation plate 451 and has a dehumidifying air inlet 454 and a dehumidifying air outlet 455. When the rotary switching member 45 is switched to the dehumidifying transporting position, the dehumidifying air inlet 454 interconnects with the vapor inlet opening 41, and the dehumidifying air outlet 455 interconnects with the dehumidifying outlet opening 43, so that the vapor V can be transported to the condensing means 5.

Referring to FIG. 1*a*, preferably, the wetting means 2 includes a linking member 21, a water pump 22, a water tank 23, and a hydraulic conducting member 24. The linking member 21 is linked to the rotary switching member 45. The hydraulic conducting member 24 is linked to the working member 21. The water pump 22 is used for pumping an external water source (not shown) to the water tank 23.

Referring to FIG. 1*a*, FIG. 7, and FIG. 8, in the first embodiment, the hydraulic conducting member 24 includes a fixed member 241 and two clamping members 242. The fixed member 241 is fixed on the axle 11 of the hygroscopic wheel 1 with corresponding to both hygroscopic surfaces 12 and 13 of the hygroscopic wheel 1. The two clamping members 242 are disposed on a pivoting portion 243 of the fixed member 241. Each clamping member 242 has a water inlet 244, a water outlet 245, and an elastic member 246. The water inlet 244 is interconnected between the water tank 23 and the water outlet 245. The elastic member 246 is provided corresponding to the water outlet 245 for guiding the water flow. In the first embodiment, the water pump 22 pumps water from the external water source when the water tank 23 is empty. After the water pump 22 pumps water from the external water source to the water tank 23, the water will flow the water tank 23 to the water inlet 244 because of gravity and then flow out from the water outlet 245.

Referring to FIG. 7, when the rotary switching member 45 is switched to the humidifying transporting position, the working member 21 affected by linkage of the rotary switching member 45 to move to the first position, the clamping members 242 of the hydraulic conducting member 24 are rotated in a small angle with the pivoting portion 243 as an axis due to gravity, and the elastic member 246 of the hydraulic conducting member 24 contacts the both hygroscopic surfaces 12 and 13 of the hygroscopic wheel 1, and the water flowing out from the water outlet 245 is guided by the elastic member 246 to the both hygroscopic surfaces 12 and 13 of the hygroscopic wheel 1.

Referring to FIG. 1*a* and FIG. 8, when the rotary switching member 45 is switch to the dehumidifying transporting position, the linking member 21 affected by linkage of the rotary switching member 45 to move to a second position, and the two clamping members 242 of the hydraulic conducting member 24 are pressed by the linking member 21 to separate the elastic member 246 of the hydraulic conducting member 24 from the both hygroscopic surfaces 12 and 13 of the hygroscopic wheel 1 so as to avoid the attrition of the elastic member 246 caused by the rotation of the hygroscopic wheel 1. However, the present invention is not limited to this. Referring to FIG. 1*b*, the wetting means 2 of the humidity regulating apparatus 100*a* includes a water spraying member 25 according to the second embodiment of the present invention. The water spraying member 25 includes a water inlet 251 connected to the water tank 23 and multiple water outlets 252 connected to the water inlet 251. The multiple water outlets 252 are disposed corresponding to the both hygroscopic surfaces 12 and 13 of the hygroscopic wheel 1 so as to supply water to the hygroscopic wheel 1.

Referring to FIG. 1*a*, preferably, according to the first embodiment of the present invention, the humidity regulating apparatus 100 further includes an external fan 6 which is thermally connected to the condensing means 5. The external fan 6 is used for reducing the temperature inside the condensing means 5 to enhance the condensation of the vapor V within the condensing means 5.

Referring to FIG. 8, optionally, according to the first embodiment of the present invention, the condensing means 5 is provided with a separator 51 for extending the contacting surface between the vapor V and the condensing means 5, thus facilitating rapid condensation of the vapor V. However, the present invention is not limited to this. The condensing means 5 may be provided with a separator 52 that has a vent hole, so that it not only extends the contacting surface between the vapor V and the condensing means 5 but also enables air ventilation through the vent hole of the separator 52, such that the temperature of the vapor V can be decreased faster to speed-up the condensation of the vapor V. Preferably, the condensing means 5 is provided with a draining portion 53 for draining the condensed water out of the condensing means 5.

Referring to FIG. 1*a*, according to the first embodiment of the present invention, the wetting means 2 is disposed adjacent to the heating means 3 according to the rotation direction D of the hygroscopic wheel 1. When there is a necessity to humidify the target environment, the hygroscopic wheel 1 absorbs the water supplied by the wetting means 2, and then the portion of the hygroscopic wheel 1 which contains the absorbed water supplied by the wetting means 2 rotates in the direction D to correspond with the heating means 3. In this way, it is able to decrease moisture absorption of the hygroscopic wheel 1 in the target environment while performing the humidifying process, thus avoiding energy waste.

Referring to FIG. 1*a*, FIG. 2 and FIG. 3, optionally, the humidity regulating apparatus 100 further includes a relative humidity sensing means 7 disposed on a windward surface 61 of the external fan 6 for sensing the relative humidity of the target environment more accurately.

Referring to FIG. 1*a*, optionally, according to the first embodiment of the present invention, the heating means 3 is disposed corresponding to the hygroscopic surfaces 12 and 13 of the hygroscopic wheel respectively, wherein the heating means is provided with an airflow inlet 31 and an airflow outlet 32 interconnected with the airflow inlet 31. The airflow inlet 31 is disposed corresponding to the hygroscopic surface 12, and the airflow outlet 32 is disposed corresponding to the hygroscopic surface 13. Preferably, the humidity regulating apparatus 100 further includes an internal fan 8 for exhausting the vapor V out of the heating means 3. The internal fan 8 interconnects with the airflow inlet 31 and the airflow outlet 32 to generate an air flow flowing from the airflow inlet 31 to the airflow outlet 32, so as to bring the vapor V generated by the heating means 3 to the vapor inlet opening 41. In the embodiment, the condensing means 5 is provided with a vent hole 54 that interconnects with the internal fan 8, and the internal fan 8 is disposed on the vent hole 54.

Optionally, as referring to FIG. 4, according to the first embodiment of the present invention, the housing member 44 is provided with a vent hole 441 and a drain hole 442. The vent hole 441 is provided corresponding to the vent hole of the separator 52. While the rotary switching member 45 is switched to the humidifying transporting position, the air flows through the vent hole of the separator 52 from the external fan 6, enters into the housing member 44 through the vent hole 441, and then enters the condensing means 5 from the dehumidifying outlet opening 43. The drain hole 442 is used to drain the water condensed in the housing member 44.

The above are the preferred possible embodiments of the present invention, which are not intended to limit the scope of right of the present invention, so the equivalent structural changes according to the content of the specification and the drawings of the present invention are considered to be included within the scope of right of the present invention.

What is claimed is:

1. A humidity regulating apparatus, which is applied in a target environment where the relative humidity is to be regulated, comprising:
   a hygroscopic wheel for being rotated in a direction to absorb moisture and water surrounding the hygroscopic wheel;
   a wetting means disposed in a position corresponding to the hygroscopic wheel, wherein the wetting means performs a movement in relation to the hygroscopic wheel and is controlled to supply moisture or water to the hygroscopic wheel;
   a heating means thermally connected with the hygroscopic wheel, wherein the heating means performs a movement in relation to the hygroscopic wheel to heat the moisture and water absorbed within the hygroscopic wheel to evaporate into vapor;
   a transporting means having a vapor inlet opening, a humidifying outlet opening, and a dehumidifying outlet opening, wherein the vapor inlet opening is connected with the heating means for importing the vapor thereto, the transporting means is configured to switch between a state that the vapor inlet opening interconnects with the humidifying outlet opening with which the target environment is interconnected and a state that the vapor inlet opening interconnects with the dehumidifying outlet opening; and
   a condensing means, connected with the dehumidifying outlet opening, for collecting and condensing the imported vapor to reduce the relative humidity in the target environment.

2. The humidity regulating apparatus of claim 1, further comprising an external fan, which is thermally connected with the condensing means.

3. The humidity regulating apparatus of claim 1, further comprising an internal fan, which is thermally connected with the heating means.

4. The humidity regulating apparatus of claim 1, wherein the wetting means is disposed adjacent to the heating means according to the rotation direction of the hygroscopic wheel.

5. The humidity regulating apparatus of claim 1, wherein the hygroscopic wheel has two hygroscopic surfaces, and wherein the heating means is disposed to both hygroscopic surfaces of the hygroscopic wheel.

6. The humidity regulating apparatus of claim 1, wherein the transporting means includes a rotary switching member which is rotatably mounted within the transporting means and has a humidifying air passage and a dehumidifying air passage that are separated from each other by an isolation plate, the rotary switching member is switched between a humidifying transporting position and a humidifying transporting position in which the humidifying air passage is interconnected between the vapor inlet opening and the humidifying outlet opening when the rotary switching member is switched to the humidifying transporting position, and the dehumidifying air passage is interconnected between the vapor inlet opening and the dehumidifying outlet opening when the rotary switching member is switched to the dehumidifying transporting position.

7. The humidity regulating apparatus of claim 1, wherein the condensing means is provided with a separator.

8. The humidity regulating apparatus of in claim 1, wherein the condensing means is provided with a drain terminal for draining away condensed water from the condensing means.

9. The humidity regulating apparatus of claim 1, further comprising a relative humidity sensing means for sensing the relative humidity in the target environment.

10. The humidity regulating apparatus of claim 6, wherein the hygroscopic wheels has two hygroscopic surfaces, wherein the wetting means includes a linking member and a hydraulic conducting member, the linking member is linked to the rotary switching member, the hydraulic conducting member is linked to the linking member, the hydraulic conducting member is in contact with both hygroscopic surfaces of the hygroscopic wheel when the rotary switching member is switched to the humidifying transporting position, and the hydraulic conducting member is pressed by the linking member to detach from both hygroscopic surfaces of the hygroscopic wheel when the rotary switching member is switched to the dehumidifying transporting position.

11. The humidity regulating apparatus of claim 6, wherein the transporting means includes an actuating member, which is linked to the rotary switching member.

12. The humidity regulating apparatus of claim 10, wherein the wetting means includes a water spraying member.

* * * * *